Patented June 18, 1940

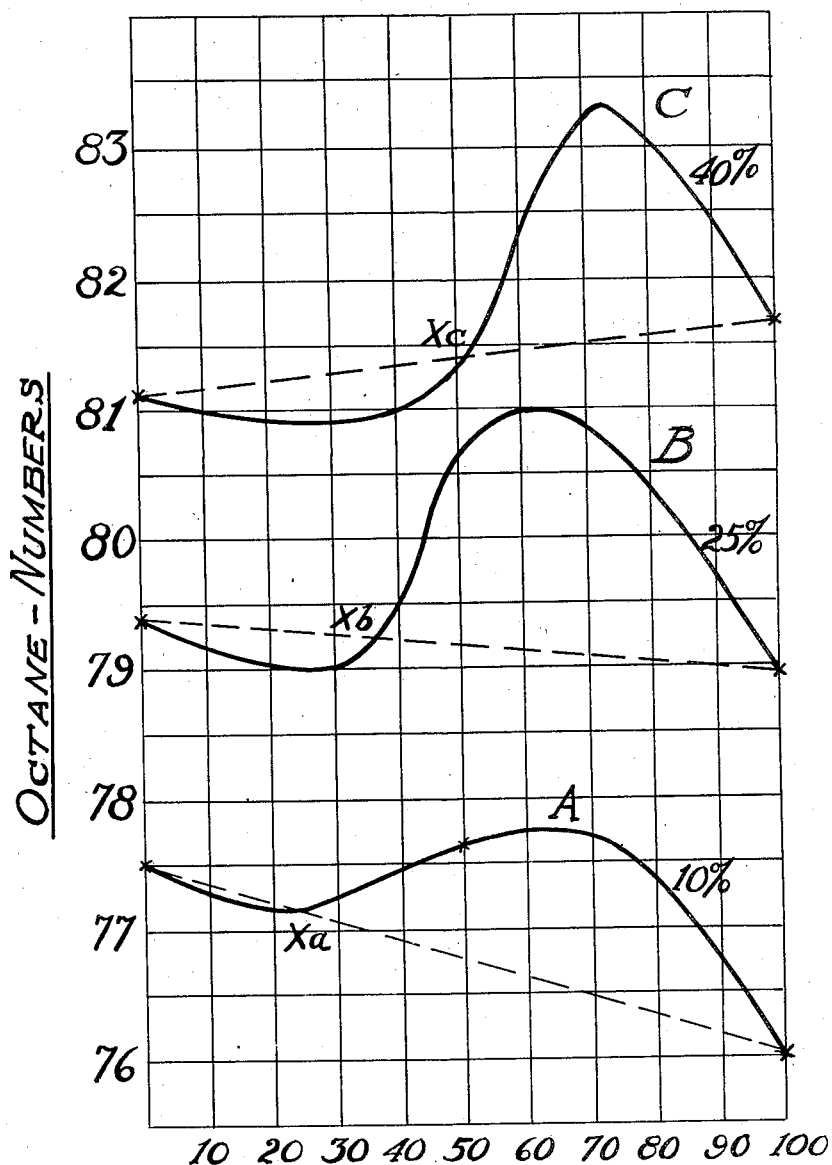

2,205,107

UNITED STATES PATENT OFFICE 2,205,107

MOTOR FUEL COMPOSITION

Raphael Rosen, Elizabeth, N. J., assignor to Standard Oil Development Company, a corporation of Delaware Application October 23, 1935, Serial No. 46,277

1 Claim. (Cl. 44—9)

The present invention relates to motor fuels and more specifically to an improved blended composition characterized in anti-detonation properties of high degree. The invention will be fully understood from the following description.

The drawing is a plot in which the anti-detonation property is shown as a function of fuel composition.

There have been many efforts in the past ten years or more to improve the anti-detonation value of motor fuels and for this purpose many substances have been added to gasoline; for example, benzol or other aromatics, alcohols, and metallo-organic agents such as tetraethyl lead. For some purposes it has been preferable to use only hydrocarbon constituents and benzol has been preferred for these specific uses. Recently, olefin polymers such as the dimers and trimers of olefins containing from two to five carbon atoms have been used with great advantage because these materials can be prepared from the waste gases produced in the cracking of oils. These materials are endowed with more or less great anti-detonation properties depending upon the method of manufacture and the particular olefins used. Olefin polymers may be readily hydrogenated and such hydrogenated materials have also been proposed as motor fuel constituents. The hydrogenated polymers are quite different from the unhydrogenated olefin polymers showing entirely different blending properties particularly in respect to anti-detonation.

Among the particular olefins which may be used are ethylene, propylene, but particularly isobutylene. Mixtures may be polymerized among which the co-polymers of butylene and isobutylene are of particular value. The polymerization may be conducted in any desired manner, for example by the action of heat and pressure in the absence of catalysts or by the action of solid catalysts at elevated temperatures, with or without pressure. They may be likewise produced by the action of liquid polymerizing agents of the type of sulfuric acid, aluminum chloride, boron fluoride and the like. Sulphuric acid is a particularly desirable agent for polymerizing isobutylene because the strength of acid and other conditions may be adapted to selectively polymerize this material and produce an anti-knock blending agent of extremely valuable properties.

Motor fuel blends have been made up containing more than one of the various anti-detonation agents and it has been found that each agent often exerts its anti-detonation power without reference to the other addition agent. In some instances the effect of mixture is less than might be supposed for the individual effects and only in very few cases is it greater. In other words, the effects of the various materials are generally additive and therefore it is possible to calculate at least approximately the effect of the addition of various amounts of the different ingredients. It has been found, however, that this is not the case with mixtures of olefin polymers with hydrogenated olefin polymers. These materials seem to be quite different from the majority of addition agents. The effectiveness of the hydrogenated polymers is not so great when used in small proportions as when used in relatively larger quantities. It has also been found that unhydrogenated olefin polymers work in precisely the opposite direction; that is to say, their influence is disproportionately large when used in relatively small amounts and unexpectedly small when used in relatively large quantities.

The present invention deals with a composition containing gasoline, a relatively small amount of the unhydrogenated polymers and a relatively larger amount of hydrogenated olefin polymers. In this way motor fuels can be obtained with a maximum anti-detonation effect for any particular amount of the combined blending agent added.

Turning to the drawing, there is represented a plot on Cartesian co-ordinates. As the ordinate the anti-detonation value of the particular blend is plotted in terms of octane numbers. This unit, octane number, is thoroughly familiar to the petroleum industry and represents the anti-detonation value of a particular blend of iso-octane and normal heptane. To determine the octane number of any particular gasoline, its anti-detonation power is matched by a mixture of iso-octane and normal heptane, the determination being made on the C. F. R. engine according to the test conditions as described in A. S. T. M. Designation D 357-34T Am. Soc. Testing Materials Committee D-2. The percentage of iso-octane in this matched blend represents the octane number of the fuel.

As abscissa on the plot, the composition of the blending agent is used, the numbers running from 0 to 100%. This does not represent the total amount of the blending agent added, but merely the composition of the blending agent. In other words, the 0 point indicates that only unhydrogenated olefin polymer is used and the 100% point indicates that only hydrogenated polymer is used. The 50% point as will be understood means that the blending agent was made up of equal parts of hydrogenated and unhydrogenated polymer. There are three curves in heavy lines on this plot indicated A, B and C. The curve A represents the octane numbers of fuels in which the blending agent amounted to 10% of the gasoline. Thus if we read upwardly on the 50% abscissa line of the curve, we find the octane number of a fuel containing 90% of gasoline, 5% of unhydrogenated olefin polymer and 5% of the same polymer which has been hydrogenated. The curve B, on the other hand, is similar to A except that it has been plotted using 25% of the combined blending agent instead of 10% as shown in curve A. In the same manner curve C represents the octane numbers of blends containing 40% of the combined agent.

On the plots dotted lines will be seen connecting the ends of the three curves A, B and C respectively. These lines represent the values of octane numbers which would be obtained if the blending agent components acted in a purely normal or additive manner; that is to say, if each exerted its own effect without reference to the effect of the other added constituent. It will be seen that all of the curves A, B and C are of the same general type; that the true octane numbers of blends containing relatively small amounts of the hydrogenated olefin polymer fall below the dotted line which represents the calculated value. On each curve there is a point X where the full line representing the true value crosses the calculated value line and from thence on toward the left, toward increasing amounts of hydrogenated olefin polymers, the heavy curves rise considerably above the dotted lines. There is on each curve a decided maximum. It is not so clearly defined in the 10% curve A but it is extremely sharp in the 40% curve C and occurs approximately when the total added ingredients consist of ¾ hydrogenated polymer and ¼ unhydrogenated polymer.

The curves on the plots represent actual data obtained in the engine. The base fuel to be used was a Pecos gasoline which had an octane number of 75.3. The olefin polymer used was a dimer fraction of isobutylene and the same material was hydrogenated in order to obtain the hydro dimer. The dimer fraction was obtained by selective polymerization of isobutylene from a mixture of hydrocarbons of four carbon atoms by contact in liquid phase with 50 to 60% sulphuric acid at normal temperature. The fraction contained small amounts of co-polymer of isobutylene and normal butylene and probably small amounts of other polymers but it was primarily diisobutylene.

It should be noted that in each of the curves A, B and C it is possible by blending hydrogenated with unhydrogenated polymer to obtain an octane number blend higher than could be obtained by adding the same amount of the blending agent which was either pure unhydrogenated or pure hydrogenated polymer. In the case of the 10% blend, the maximum is not greatly above that value which could be obtained by using 10% of the unhydrogenated polymer but, on the other hand, the maximum point is more than one octane number higher than what one would suppose from the normal blending values of the two components in the same proportion.

In the case where 25% of the polymer is added the maximum is about 1½ octane numbers above the value which would be obtained by the use of the same amount of unhydrogenated polymer and is almost two points on the octane scale higher than the calculated value.

In the case of the 40% the maximum is quite sharp and occurs when about two volumes of the hydrogenated polymer are used to one volume of the unhydrogenated polymer. It is decidedly more than two octane numbers above the calculated figure for the blend.

These curves are approximately correct for the particular gasoline used and for the particular types of polymers employed but they would not be expected to hold precisely for any other fuel or for polymers prepared in any other manner. The form and shapes of the curve are characteristic, however.

The motor fuels illustrated above thus consist of three principal constituents, first, the normal gasoline which may be a straight run or a cracked gasoline or any blend such as is produced in the ordinary refinery, a second ingredient in a minor quantity, an olefin polymer, the olefin consisting of those having less than five carbon atoms and a third ingredient, in a minor quantity, a hydrogenated polymer derived from the same ingredients as mentioned above for the unhydrogenated polymer but present in larger amount. In addition to the above, of course, other ingredients may be employed, for example, anti-detonation agents of the type of tetraethyl lead or other equivalent metallo-organic compounds. Aromatics may be also used such as benzol, as well as small amounts of gum flux, lubricating oils and the like, but it will be understood that none of these need be added.

The present invention is not to be limited to any theory of the effect of various ingredients on anti-detonation properties nor to any particular type of olefin or hydrogenated olefin polymer, nor to any particular process for producing such polymers but only to the following claim in which it is desired to claim all novelty inherent in the invention.

I claim:

A motor fuel comprising gasoline and at least 25% of a polymer blend comprising di-isobutylene and hydrogenated di-isobutylene, the proportion of the latter being at least three times the proportion of the former.

RAPHAEL ROSEN.